United States Patent
Gribok et al.

(10) Patent No.: US 8,250,129 B2
(45) Date of Patent: Aug. 21, 2012

(54) CRYPTOGRAPHIC RANDOM NUMBER GENERATOR USING FINITE FIELD OPERATIONS

(75) Inventors: Sergey Gribok, Santa Clara, CA (US);
Alexander Andreev, San Jose, CA (US);
Sergey Gashkov, Moscow (RU)

(73) Assignee: LSI Corporation, Milpitas, CA (US)

( * ) Notice: Subject to any disclaimer, the term of this patent is extended or adjusted under 35 U.S.C. 154(b) by 1392 days.

(21) Appl. No.: 11/821,212

(22) Filed: Jun. 22, 2007

(65) Prior Publication Data
US 2008/0320066 A1 Dec. 25, 2008

(51) Int. Cl.
*G06F 1/02* (2006.01)
*G06F 7/58* (2006.01)

(52) U.S. Cl. ...................................... 708/251
(58) Field of Classification Search ........... 708/250–256
See application file for complete search history.

(56) References Cited

U.S. PATENT DOCUMENTS

| | | | | |
|---|---|---|---|---|
| 4,890,252 | A * | 12/1989 | Wang | 708/250 |
| 5,031,130 | A * | 7/1991 | Harada | 708/250 |
| 5,706,218 | A | 1/1998 | Hoffman | 364/717 |
| 5,910,907 | A | 6/1999 | Chen et al. | 364/724.1 |
| 6,285,761 | B1 * | 9/2001 | Patel et al. | 380/44 |
| 6,480,072 | B1 * | 11/2002 | Walsh et al. | 331/78 |
| 6,650,687 | B1 * | 11/2003 | McDonough | 375/140 |
| 7,072,924 | B1 | 7/2006 | Purcell et al. | 708/256 |
| 7,233,212 | B2 | 6/2007 | Boerstler et al. | 377/98 |
| 2005/0033785 | A1 * | 2/2005 | Umeno et al. | 708/250 |
| 2007/0244950 | A1 * | 10/2007 | Golic | 708/250 |
| 2008/0025500 | A1 | 1/2008 | Izu et al. | |

FOREIGN PATENT DOCUMENTS

| | | |
|---|---|---|
| EP | 2003546 A2 | 12/2008 |
| WO | 2006015625 A1 | 2/2006 |
| WO | 2006077651 A1 | 7/2006 |

OTHER PUBLICATIONS

Charles C. Wang and Dingyi Pei, A VLSI Design for Computing Exponentiations in GF(2m) and Its Application to Generate Pseudorandom Number Sequences, IEEE Transactions on Computers, vol. 39, No. 2, Feb. 1990, pp. 258-262.*
International Search Report and Written Opinion of PCT/US08/07346 filed on Jun. 12, 2008.
Examination Report from United Kingdom Patent Application No. 1001005.6 dated Dec. 5, 2011.
United Kingdom Examination Report dated Apr. 13, 2012, from United Kingdom Patent Application No. GB1001005.6.
Chinese Office Action dated May 3, 2012, from Chinese Patent Application No. 200880101671.
Japanese Notification of Reasons for Rejection dated Jun. 4, 2012 for Japanese Patent Application No. 2010-513196.

* cited by examiner

*Primary Examiner* — Lewis A Bullock, Jr.
*Assistant Examiner* — Kevin G Hughes
(74) *Attorney, Agent, or Firm* — Alan G. Rego; Westman, Champlin & Kelly, P.A.

(57) ABSTRACT

An apparatus and method are provided in various illustrative embodiments for an integrated circuit chip that provides a fast, compact, and cryptographically strong random number generator. In one illustrative embodiment, an apparatus includes an initial random source, and a post-processing block in communicative connection with the initial random source. The post-processing block is configured to receive signals from the initial random source, to apply one or more finite field operations to the signals to generate an output, and to provide an output signal based on the output via an output channel, in this illustrative embodiment.

12 Claims, 3 Drawing Sheets

CRYPTOGRAPHIC RANDOM NUMBER GENERATOR USING FINITE FIELD OPERATIONS

FIELD OF THE DISCLOSURE

The present disclosure relates to electrical circuits, such as semiconductor integrated circuits. More particularly, the present disclosure relates to electrical circuits that serve as true random number generators.

BACKGROUND OF THE INVENTION

Semiconductor integrated circuits often incorporate hundreds of thousands of semiconductor elements on a single chip. These elements are interconnected to perform a desired function.

One such function that may be performed by an integrated circuit chip is random number generation. A random number generator (RNG) is a device designed to generate a sequence of elements, such that the sequence can be used as a random one. This randomness may typically be evaluated by various randomness test suites that measure the cryptographic strength of the random sequence produced by the random number generator. Many components used as random number generators are actually pseudorandom or otherwise cryptographically weak; they may incorporate some appearance of randomness, but actually be revealed to have more or less predictability when analyzed. On the other hand, a cryptographically strong random number generator generates a random number sequence that remains unpredictable despite significant analysis, so that it becomes computationally infeasible to predict what a future bit of the random output will be, even given complete specification of the random number generator.

Cryptographically strong RNG's are used in cryptographic integrated circuits for cryptographic tasks such as key generation, stream ciphers' design, and so on.

Improved methods and apparatus are desired for generating true random numbers with a unit that is fast, compact, and cryptographically strong.

The discussion above is merely provided for general background information and is not intended to be used as an aid in determining the scope of the claimed subject matter.

SUMMARY

An aspect of the present disclosure is directed to an apparatus. According to one illustrative embodiment, the apparatus includes an initial random source, and a post-processing block in communicative connection with the initial random source. The post-processing block is configured to receive signals from the initial random source, to apply one or more finite field operations to the signals to generate an output, and to provide an output signal based on the output via an output channel, in this illustrative embodiment.

Another aspect of the present disclosure is directed to a method. According to one illustrative embodiment, the method includes generating an initial random signal with a ring oscillator. The initial random signal is used as a control signal to select from among a plurality of optional input signals. One or more finite field operations are performed on the input signals. The result of the one or more finite field operations is provided as an output signal, in this illustrative embodiment.

Another aspect of the present disclosure is directed to an integrated circuit device. According to one illustrative embodiment, the integrated circuit device includes a ring oscillator, a multiplexer, a finite field multiplication component, a finite field squaring component, and an accumulator. The multiplexer includes two data signal inputs, a control signal input, and an output. The control signal input is communicatively connected to an output of the ring oscillator. The finite field multiplication component includes first and second inputs and an output. The first input of the finite field multiplication component is communicatively connected to the output of the multiplexer. The finite field squaring component includes an input and an output. The output of the finite field multiplication component is communicatively connected to the second input of the finite field squaring component. The accumulator includes an input and an output. The input of the accumulator is communicatively connected to the output of the finite field multiplication component, and the output of the accumulator is communicatively connected to both the input of the finite field squaring component, and to an output channel, in this illustrative embodiment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

Figure 1:
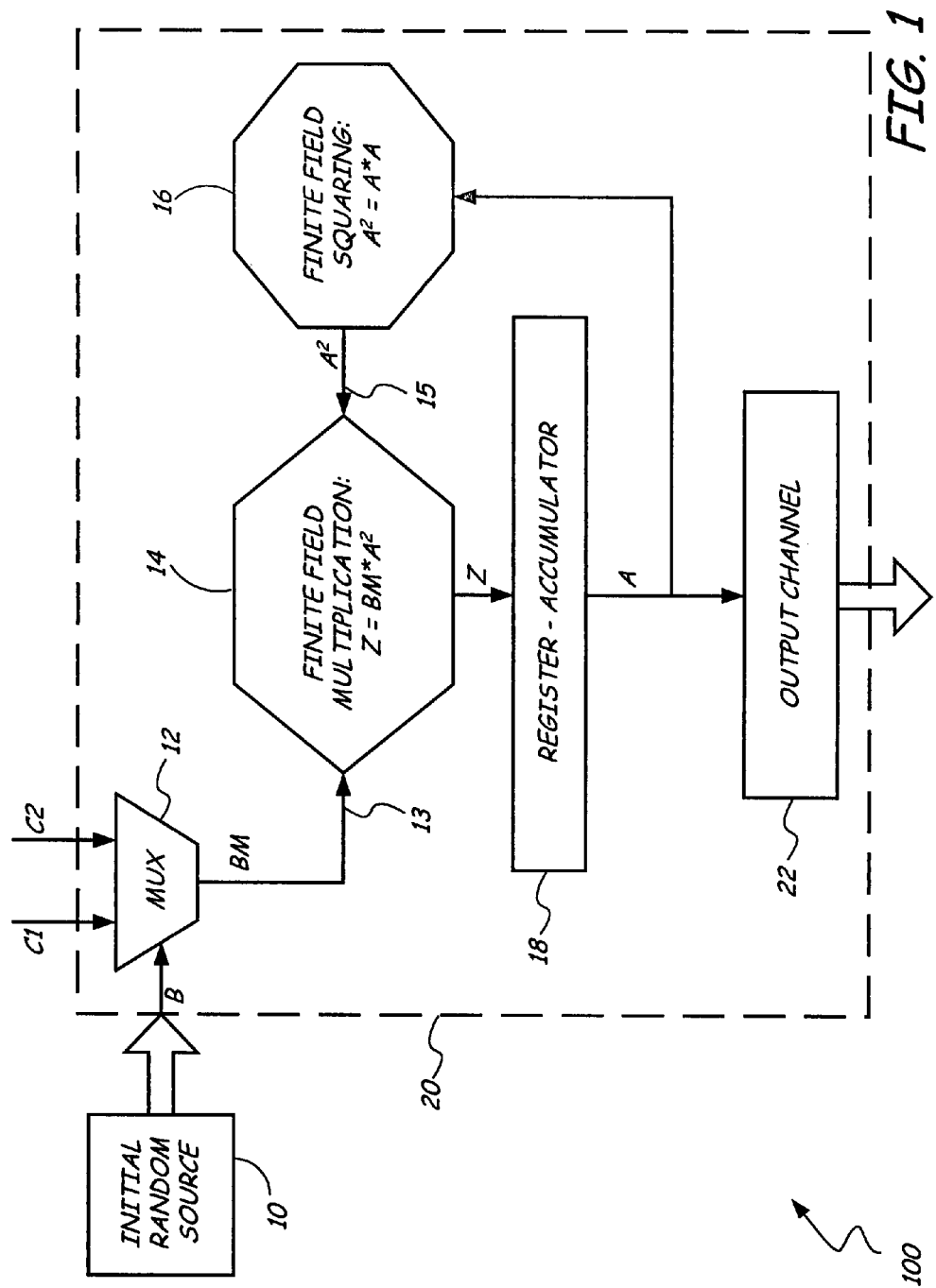
FIG. 1 provides a block diagram depicting a random number generator core module structure, according to one illustrative embodiment.

FIG. 1 provides a block diagram that illustrates an apparatus 100 configured for generating random numbers using finite field operations, according to an exemplary embodiment of the disclosure. The apparatus 100 may be embodied as an integrated circuit device, for example, which embodies the different depicted elements on one or more integrated circuit chips. Those elements may be connected to each other with communicative connections, capable of transmitting signals from one component to another, such as through various inputs and outputs. The apparatus 100 includes an initial random source 10 and a post-processing block 20 that is in communicative connection with the initial random source 10 by means of the output B of initial random source 10, in this illustrative embodiment. The initial random source 10 may be embodied as one or more ring oscillators, for example. One illustrative embodiment of an initial random source is described below with reference to FIG. 2.

Post-processing block 20 includes several components in this illustrative embodiment, including multiplexer 12, finite field multiplication component 14, finite field squaring component 16, accumulator 18, and output channel 22. Finite field multiplication component 14 and finite field squaring component 16 are illustrative examples of elements within post-processing block 20 that are configured to execute finite field operations, also known as Galois field operations, for example.

Multiplexer 12 includes two data signal inputs C1 and C2, and a control signal input connected to the output B of initial random source 10, as well as an output which is connected to a first input 13 of finite field multiplication component 14. Post-processing block 20 is thereby configured to communicate the output signal BM from multiplexer 12 to finite field multiplication component 14. Besides first input 13 which is communicatively connected to the output of multiplexer 12, finite field multiplication component 14 also has a second input 15, and an output which is communicatively connected to an accumulator 18. Finite field multiplication component 14 is configured to perform a finite field multiplication operation on the two signals received through the two inputs 13 and 15 to generate a resulting output signal, and is configured to communicate that resulting output signal Z to accumulator 18, in this illustrative embodiment.

Accumulator 18 includes both an input and an output, the input being connected to the output of the finite field multiplication component 14. A node connected to the output of accumulator 18 allows the output thereof to be connected to both finite field squaring component 16 and an output channel 20. Finite field squaring component 16 is configured to perform a finite field squaring operation, such as finite field squaring of the input. Finite field squaring component 16 includes both an input connected to the output of accumulator 18, and an output which is connected to the second input 15 of the finite field multiplication component. The finite field multiplication component 14, finite field squaring component 16, and accumulator 18 thereby form a cyclic loop, while accumulator 18 also provides its output signal to output channel 20, which may convey iterations of a final random output from apparatus 10. Output channel 20 may also either provide the output signal from accumulator 18 as is, or may perform additional end-processing steps, such as selecting a subset of bits from the output signal, such as from the middle thereof in one illustrative embodiment, and provide that subset of bits as the final random output signal. The final random output signal is thus cryptographically strong, and iterations thereof may be provided rapidly, and from a compact package, according to the present illustrative embodiment of apparatus 10.

The signal provided to the first input of finite field multiplication component 14 is based on the initial random source in that it is selected from among the inputs to multiplexer 12 in a selection that is controlled by the initial random source 10, in this illustrative embodiment. The signal provided to the input of finite field multiplication component 14 may be based on the output of the initial random source 10 in a wide variety of other ways in various embodiments, such as by receiving the output of initial random source 10 directly, or after one or more prior transformations, or by receiving a signal that is in some other way controlled by the output of the initial random source, in different embodiments.

Post-processing block 20 is thereby configured to receive an input signal BM based on the initial random source 10, using components such as finite field multiplication component 14 and finite field squaring component 16 to apply finite field operations to the input signal BM to generate a randomized output Z, and to provide an output signal A via an output channel 20 wherein the output signal A is based at least in part on the randomized output Z. Output signal A is also communicated to finite field squaring component 16 which performs a finite field squaring to provide $A^2=A*A$ as its output, and $A^2$ is provided to second input 15 of finite field multiplication component 14. This yields a combined finite field operation for post-processing block 20, for each iteration n of randomized signal, of a randomized output Z generated according to:

$$Z(n+1)=BM*[A(n)]^2$$

Figure 2:
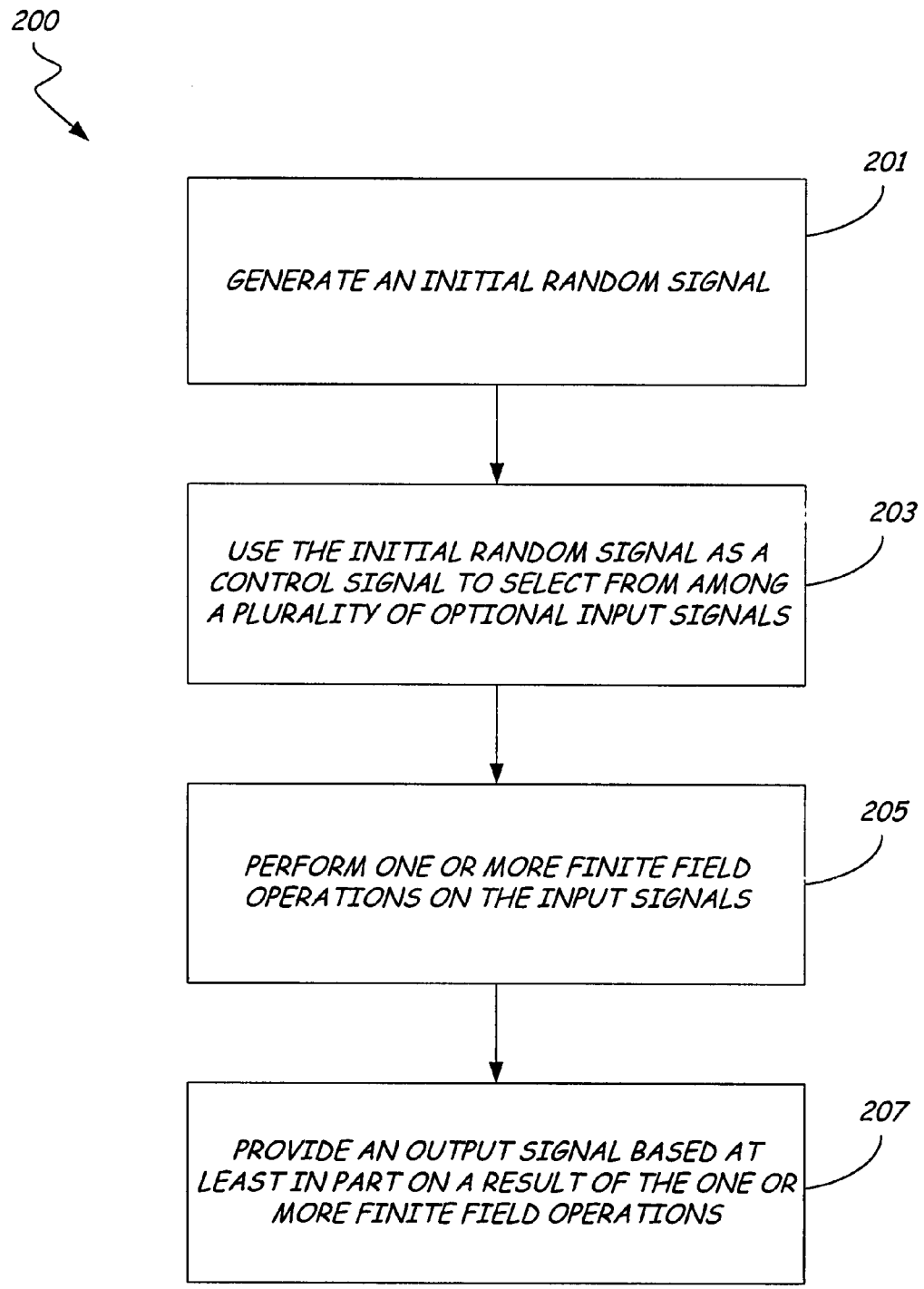
FIG. 2 provides a flowchart illustrating a method for generating a random number, according to one illustrative embodiment.

The function of apparatus 100 may be further illustratively demonstrated with reference to the flowchart 200 of FIG. 2, prior to more detailed description of the components of apparatus 100. FIG. 2 provides a flowchart illustrating a method 200 for generating random numbers using finite field operations, as may illustratively be performed by apparatus 100 of FIG. 1. Method 200 includes step 201, of generating an initial random signal, such as may illustratively be done with initial random source 10 of apparatus 100, for example. Method 200 further includes step 203, of using the initial random signal as a control signal to select from among a plurality of optional input signals, as may illustratively be done with multiplexer 12 of apparatus 100, for example. The plurality of optional input signals could be two optional input signals, as shown with the two inputs to multiplexer 12 in FIG. 1, or could include three or any higher number of optional inputs to be chosen from, in other embodiments. Method 200 also includes step 205, for performing one or more finite field operations on the input signals, such as may illustratively be performed by either or both of finite field multiplication component 14 and finite field squaring component 16 in the example of apparatus 100. Method 200 also includes step 207, for providing an output signal based at least in part on a result of the one or more finite field operations, such as may illustratively be performed by accumulator 18 and/or output channel 20 in apparatus 100. While apparatus 100 provides certain illustrative examples of hardware elements configured to perform the steps of method 200, a wide variety of other implementations may also be used to perform different embodiments of method 200.

While finite field multiplication component 14 and finite field squaring component 16 are depicted in FIG. 1 as illustrative examples of finite field operation elements within post-processing block 20, different embodiments of post-processing blocks may include only one finite field operation element, or two as shown in FIG. 1, or any larger number of finite field operation elements. Such finite field operation elements may be configured to perform finite field operations such as finite field addition, finite field multiplication, finite field squaring, or any other finite field operation. The signals received .and generated by the finite field operation elements may also be arranged in a wide variety of configurations in different embodiments. While the illustrative embodiment of FIG. 1 features a finite field multiplication component that provides the input to the finite field squaring element, and the finite field squaring element in turn provides its output as one of the inputs to the finite field multiplication component, this is only one illustrative configuration.

Other configurations may, for example, use the outputs of one or more finite field operation elements as inputs to a finite field addition component, or to a finite field multiplication component, or to a finite field squaring component, or to another type of finite field operation component. A third, fourth, or other number of finite field operation element may also be connected with the first two finite field operation components that are depicted in FIG. 1, with the output from the second used as an input for the third, the output from the third used as an input of the first or of the fourth, the output of the fourth used as an input to the first or a fifth finite field operation element, and so forth. Any of these finite field operation elements may be a finite field addition element, a finite field multiplication element, a finite field squaring element, or any other type of finite field operation element. Such elements therefore contribute to configuring post-processing block 20 for applying any of a variety of finite field operations to a signal based on the initial random source. Any of a wide variety of configurations of mutually connected finite field operation elements may therefore be used to generate cryptographically strong random outputs, according to a variety of different embodiments.

Finite field operations are well-suited for generating a cryptographically strong random output. A finite field is a field that contains only finitely many elements. Every finite field has $p^n$ elements for some prime number p and some integer n>0, such that a finite field is denoted by $GF(p^n)$ (where "GF" indicates a Galois field, as synonymous terminology for a finite field). In some embodiments, it is found to be practical to use p=2, rendering the finite field as $GF(2^n)$. In this case, the elements of $GF(2^n)$ can be considered as n-bit binary vectors.

Finite field operations can be efficiently embodied in hardware elements such as finite field multiplication component 14, finite field squaring component 16, a finite field addition component (not included in the illustrative embodiment of FIG. 1), or other types of finite field operation elements. As an illustrative example, a finite field addition component may be embodied using bitwise addition of corresponding binary vectors. As another illustrative example, a finite field multiplication element may be embodied with a circuit that includes approximately $7n^2$ logic NAND gates and has a maximum number of logic levels of approximately 4 log(n). As yet another illustrative example, a finite field squaring element that performs a finite field squaring, can be embodied using a cyclic shift of an input binary vector. Other operations may also be embodied in other finite field operation elements.

For example, in one illustrative embodiment, the finite field operation elements may be configured to perform finite field operations over finite fields $GF(2^n)$ where n is a prime integer between 16 and 32. There are five prime integers within that interval: 17, 19, 23, 29, and 31. The finite fields would therefore each have either $2^{17}$, $2^{19}$, $2^{23}$, $2^{29}$, or $2^{31}$ elements. Finite field operation components for operating with these finite fields would illustratively be embodied with approximately $7n^2$ logic NAND gates. Other finite field operation components may also be used which could illustratively be embodied with a number of logic NAND gates that is approximate to $7n^2$, while allowing for a range of significant variation from that value similar, or larger still in some cases, to the variation in the case of n being either 17, 19, 23, 29, or 31. In still other examples, the finite field operation elements may also be embodied with other types of logic gates, with a mixture of NAND gates and other types of logic gates, or with other means besides logic gates.

Figure 3:
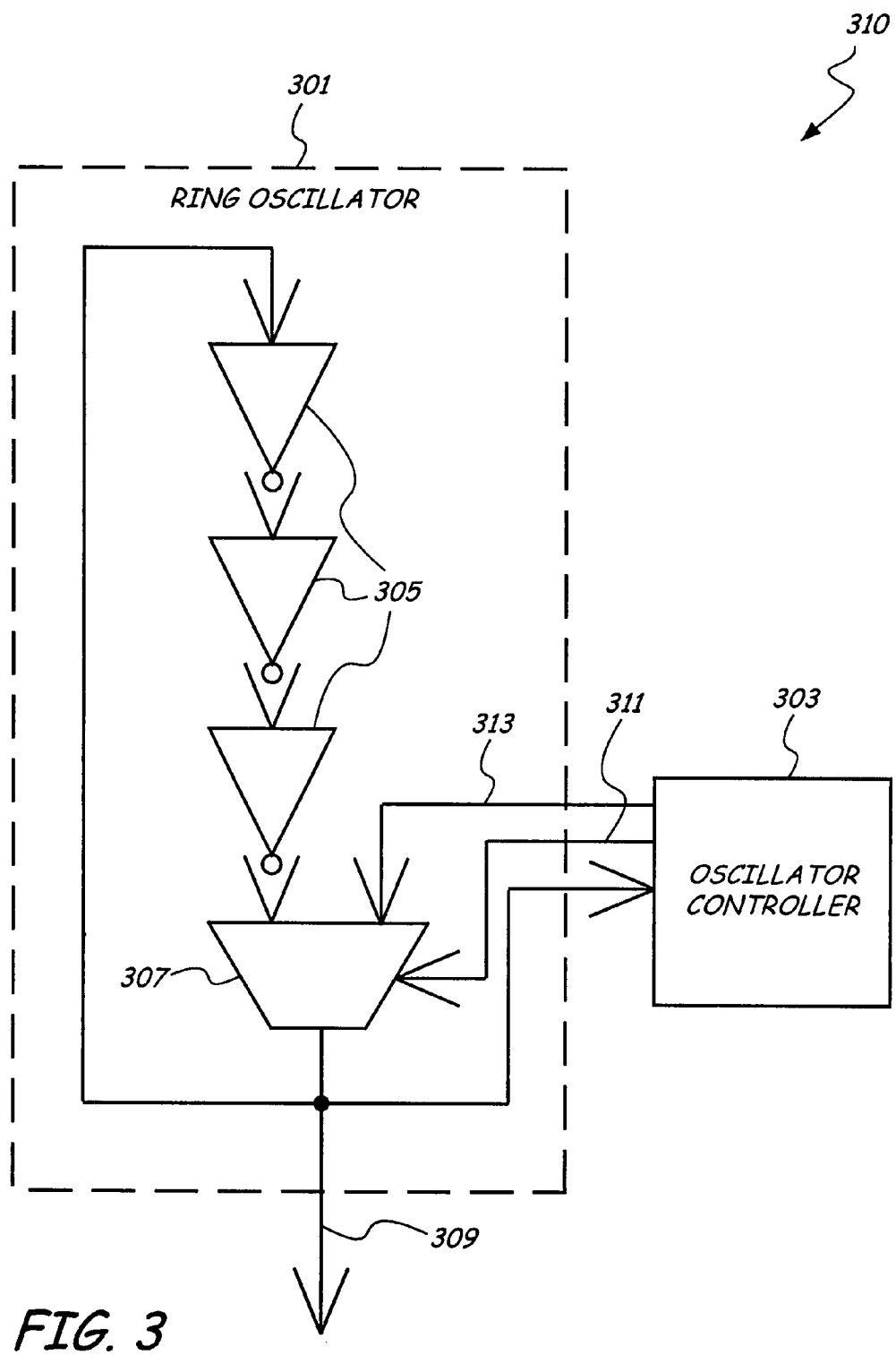
FIG. 3 provides a block diagram depicting an initial random source for a random number generator, according to one illustrative embodiment.

FIG. 3 provides additional detail for one illustrative embodiment of an initial random source 310 which may be used as initial random source 10 of apparatus 100 in FIG. 1. Initial random source 310 comprises a ring oscillator 301, along with an oscillator controller 303, in this exemplary embodiment. Ring oscillator 301 includes a set of several series-connected inverters 305, in this example. While three inverters 305 are depicted, this is suggestive only, and ring oscillator 301 may contain any number of inverters. Ring oscillator 301 may also include a set of several series-connected elements of a wide variety of other types of elements, such as buffers, logic-OR gates, or logic-AND gates, for example.

The series of inverters 305 is connected to one input of a multiplexer 307. The oscillator controller has both a data signal output 313 to the other input of multiplexer 307, and a control signal output 311 to the control setting of multiplexer 307. The output 309 of multiplexer 307 thereby constitutes an initial random signal from the initial random source 310, in this illustrative embodiment. Oscillator controller 303 checks the state of ring oscillator 301, and if the initial random signal is not toggling over a number of cycles, such as 10 to 20 cycles for example, then oscillator controller 303 may set the ring oscillator 301 to a new value, using the control signal via output 311 and the data signal via output 313. This architecture enables ring oscillator 310 to be reset to a known state or to avoid an oscillator transition to a forbidden intermediate state.

The initial random source used for different embodiments comparable to apparatus 100 of FIG. 1 may include a ring oscillator such as ring oscillator 310, or may include two or more ring oscillators, for example, where a net initial random source is derived from the combined operation of multiple ring oscillators and/or other random source generators, in different embodiments. The initial random source may also include a pseudo-random source, either alone or in combination with a ring oscillator or other random generator elements, in other embodiments. For example, the pseudo-random source may illustratively include a linear feedback shift register.

A combination of initial random source and post-processing block may also form only some elements within a larger apparatus, for example. An apparatus may include multiple random number generators working in parallel or some other cooperative configuration, where one or more of the individual random number generators may each comprise a complete package of components such as is depicted in apparatus 100 of FIG. 1, or other comparable random number generator configurations. The overall apparatus may derive an ultimate random output based on the individual random outputs of two or more of the parallel random number generators, such as by selecting a set of random output bits from each of two or more random number generator subsystems, in one illustrative embodiment. A different apparatus may also include additional elements in communicative connection with the post-processing block 20 and configured to receive the output signal from the post-processing block 20 and to perform one or more additional transformations of the output signal. These and other mechanisms may function to add further robustness to the cryptographic strength of the ultimate output signal of a random number generating apparatus, according to a wide array of different illustrative embodiments.

Although the present disclosure has been described with reference to one or more embodiments, workers skilled in the art will recognize that changes may be made in form and detail without departing from the disclosure or the appended claims. As one illustrative example, it is recognized that components that may be described in a particular embodiment may be equivalently provided in one single integrated circuit chip, or with components distributed over two or more integrated circuit chips, or with some or all elements distributed over other types of circuits, computing device elements, and other hardware and software resources. As another illustrative example, it is well understood that any instance of an element being described "illustratively" or as an "illustrative example" means in part that it refers to just one possible embodiment out of a wide variety of other embodiments with other configurations that differ from those explicitly described herein, but that will be understood by those skilled in the art to also lie within the scope of the subject matter defined by the appended claims. As another illustrative example, method steps described above may be performed by one or more integrated circuit chips, or with one or more or all of the method steps performed on other types of hardware or software elements. Many other variations among different embodiments may also be made within the metes and bounds of the subject matter described by the present disclosure and defined by the claims recited below.

What is claimed is:

1. An apparatus comprising:
one or more ring oscillators providing an initial random source; and
a post-processing block comprising:
   a multiplexer comprising two data signal inputs, a control signal input, and an output, where the control signal input receives the initial random source;
   a finite field multiplication component comprising first and second inputs and an output, wherein the first input of the finite field multiplication component receives the output of the multiplexer;
   a finite field squaring component comprising an input and an output, wherein the output of the finite field squaring component is provided to the second input of the finite field multiplication component; and
   an accumulator comprising an input and an output, wherein the input of the accumulator receives the output of the finite field multiplication component, and the output of the accumulator is provided to both the input of the finite field squaring component, and to an output channel of the post processing block.

2. The apparatus of claim 1, wherein the one or more finite field operations the post-processing block is configured to apply to the input signal comprise finite field operations over a Galois field of a prime number to the nth power, where n is a prime integer.

3. The apparatus of claim 2, the post-processing block is further configured such that n is selected from a group consisting of: 17, 19, 23, 29, and 31.

4. The apparatus of claim 2, wherein the prime number is 2.

5. The apparatus of claim 1, wherein the post-processing block is further configured to provide the output signal as a subset of bits from the randomized output.

6. The apparatus of claim 1, wherein the ring oscillator comprises a plurality of series-connected elements, wherein the elements comprise at least one element type selected from a group consisting of: inverters, buffers, logic-OR gates, and logic-AND gates.

7. The apparatus of claim 1, wherein the initial random source and the post-processing block are comprised in a first random number generator, wherein the apparatus further comprises one or more additional random number generators operating in parallel to the first random number generator, wherein the apparatus is configured such that the output signal comprises random bits from each of the first random number generator and the one or more additional random number generators.

8. The apparatus of claim 1, further comprising one or more additional elements in communicative connection with the post-processing block and configured to receive the output signal from the post-processing block and to perform one or more additional transformations of the output signal.

9. A method comprising:
generating an initial random signal from one or more ring oscillators;
using the initial random signal as a control signal to select from among a plurality of optional input signals;
performing, by a multiplier, a finite field multiplication on the selected input signal and a second value to generate a product;
accumulating, by an adder, the product;
performing, by a multiplier, a finite field square on the accumulated product to generate a squared result, wherein the squared result is provided to the finite field multiplication as the second value; and
providing an output signal based at least in part on the accumulated product.

10. An integrated circuit device comprising:
a ring oscillator;
a multiplexer comprising two data signal inputs, a control signal input, and an output, where the control signal input receives an output of the ring oscillator; a finite field multiplication component comprising first and second inputs and an output, wherein the first input of the finite field multiplication component receives the output of the multiplexer;
a finite field squaring component comprising an input and an output, wherein the output of the finite field squaring component is provided to the second input of the finite field multiplication component; and
an accumulator comprising an input and an output, wherein the input of the accumulator receives the output of the finite field multiplication component, and the output of the accumulator is provided to both the input of the finite field squaring component, and to an output channel.

11. The integrated circuit device of claim 10, wherein the finite field multiplication component is configured to multiply over a finite field of 2 to the nth power, where the finite field multiplication component comprises $7n.\sup2$ logic NAND gates.

12. The integrated circuit device of claim 10, wherein the finite field squaring component is configured to perform a cyclic shift of an input binary vector.

* * * * *